United States Patent

Routh et al.

[15] 3,688,240
[45] Aug. 29, 1972

[54] END CONNECTOR FOR A POWER DISTRIBUTION SYSTEM

[72] Inventors: Larry L. Routh, Castro Valley; James Contratto, Livermore, both of Calif.

[73] Assignee: U.S. Industries, Inc., New York, N.Y.

[22] Filed: March 16, 1970

[21] Appl. No.: 19,660

[52] U.S. Cl. ............................................. 339/21 R
[51] Int. Cl. .............................................. H01r 9/00
[58] Field of Search ........................... 339/74, 20–24, 339/221; 200/166

[56] References Cited

UNITED STATES PATENTS

| 3,283,105 | 11/1966 | Locke et al. | 200/153 |
| 2,680,233 | 6/1954 | McFarlin | 339/21 R |
| 3,496,518 | 2/1970 | Neumann et al. | 339/21 R |

FOREIGN PATENTS OR APPLICATIONS

| 40,644 | 12/1968 | Great Britain | 339/21 R |
| 284,707 | 1/1965 | Netherlands | 339/21 R |

*Primary Examiner*—Marvin A. Champion
*Assistant Examiner*—Robert A. Hafer
*Attorney*—Joseph B. Gardner

[57] ABSTRACT

An end connector for a power distribution system of the type providing an essentially continuous convenience outlet enabling electrical plugs to be connected thereto at substantially any selected location therealong. The system includes one or more elongated track components that provide such convenience outlet, and each such track component is equipped along its length with a conductor assembly comprising a plurality of spaced apart electric conductors insulated one from another. The end connector is connectable with such track component at an end thereof, and may take the form either of a splice box used to join successive track components or of an end closure used to attach an end block or junction box thereto and within which the conductors of the distribution system are connected with power supply lines. The end connector, for the purpose of establishing connection thereof with a track component, has a housing portion insertable into the end of a track component, and it is equipped with a plurality of contacts movable into engagement with the respective conductors of such track component when assembled therewith.

17 Claims, 8 Drawing Figures

Patented Aug. 29, 1972

INVENTORS:
LARRY L. ROUTH
JAMES CONTRATTO
BY Joseph B. Gardner
ATTORNEY

Patented Aug. 29, 1972

INVENTORS:
LARRY L. ROUTH
JAMES CONTRATTO
BY: Joseph B. Gardner
ATTORNEY

END CONNECTOR FOR A POWER DISTRIBUTION SYSTEM

This invention relates to a power distribution system and, more particularly, to an end connector either in the form of a splice box (or coupler) or of an end closure for a power distribution system having elongated track components provided with substantially continuous receptacles or convenience outlets therealong adapted to have plugs connected thereto at substantially any selected location along the length thereof.

As explained in the commonly assigned copending patent application of Larry L. Routh entitled "Power Distribution System," Ser. No. 695,655, filed Jan. 4, 1968, now U.S. Pat. No. 3,529,275 the location of convenience outlets, junction boxes, and other fixed points of connection within an electric power distribution system is most often a compromise with the various locations being selected on the basis of custom or anticipation of the use expected for the building space containing the distribution system. This is particularly unsatisfactory especially in commercial and industrial buildings since the use of any particular space therein is not necessarily static, and any change in use may require relocation of the various outlets and other points of connection. In this respect, the divider walls or partitions in such buildings may be changed bodily, and modern buildings are designed so as to afford ready change of such divides walls from one location to another so as to provide considerable versatility in the use of the building space. Also, in many special environments such as museums and art gallerys in which exhibits are changed periodically, and such as display windows, merchandise showrooms, restaurants, and other public spaces where regular or periodic alteration is intended, a readily changeable lighting placement is advantageous.

In view of this, power distribution systems have been proposed heretofore which are intended to afford a degree of flexibility as respects the location at which light and other electrically operated fixtures or devices may be connected thereto, and one such system is disclosed in the aforesaid U.S. Pat. No. 3,529,275. Such system includes one or more track components that provide a substantially continuous open-mouthed chamber therealong defining a convenience outlet enabling electric plugs or adaptors to be connected thereto at substantially any selected location; and a typical plug or adaptor enabling interconnection of electric fixtures to such distribution system is disclosed in the commonly assigned copending patent application of Larry L. Routh and James Contratto entitled "Adaptor for Electrical Power Distribution Track," Ser. No. 695,597, filed Jan. 4, 1968, now U.S. Pat. No. 3,503,032.

A difficulty with most of the prior power systems of this type is that interconnection of the receptacle equipped track components thereof (or connection of an end of one component with power supply lines) is effected by splice boxes or other end closures requiring special connector arrangements at the ends of the track components, and as a consequence, it is very difficult to interconnect successive track components unless they are of standard lengths equipped with such special arrangements at the ends thereof at the time of their manufacture. Clearly, this requirement imposes limitations on he use of these systems since in those instances in which standard lengths can not be employed, it has usually been necessary to have special or custom lengths made to order. In view of this, an improved power distribution system of the type affording substantially infinite selection of the locations along the lengths thereof at which lights and other electrically operated devices can be connected thereto has been developed and is disclosed in the commonly assigned copending patent application of Larry L. Routh and James Contratto entitled "Splice Box For A Power Distribution System," Ser. No. 780,840, filed Dec. 3, 1968. Such improved system has track components and splice boxes enabling quick and easy interconnection therebetween without the requirement for special connection arrangements at the ends of the track components, thereby enabling the same to be cut at the site of their installation to any requisite lengths.

The present invention is concerned with and has for a general object a further improved power distribution system and particularly the end connectors therefor which include both a splice box or coupler used to interconnect successive track components one with another and a live end connector to effect interconnection of the electric conductors at one end of a track component with power supply lines (the splice box can also be used for this purpose).

More particular objects, among others, are to provide an improved power distribution system of the character described in which interconnection of a splice box with two successive track components automatically establishes and maintains the proper circuit polarity, thereby obviating the requirement for separate polarization means for this purpose; in which the track components are used as the ground for the system and are automatically connected with each other electrically by a splice box coupling the same; in which the splice box is a unitary structure with integral contacts extending therethrough; in which both the splice box and live end closure are quickly and easily conditioned to connect the contacts with and disconnect the same from the track conductors; and in which each end connector (i.e., splice box and end closure) comprises a housing equipped with a forwardly extending section adapted to be inserted into a chamber provided along the receptacle-equipped track component, and which end connector is further provided with polarization structure cooperative with such track component to establish a predetermined positional relationship therebetween, the connector having a plurality of contacts normally disposed in an inner retracted position during such insertion of the housing section into the track component but being selectively displaceable outwardly into an extended position by manipulation of selector structure to establish connection of the contacts with the conductors of the track component. Additional objects and advantages of the invention, especially as concerns particular features and characteristics thereof, will become apparent as the specification develops.

A power distribution system embodying the present invention may include a plurality of elongated, longitudinally extending track components connected by splice boxes or couplers one with another in a succession thereof. Each track component is relatively rigid and defines a longitudinally extending convenience outlet therealong, and is intended to be supported along a ceiling or other building wall and, in many cases, is either partially or completely embedded therein. Each receptacle-equipped track component is adapted to have one or more male plugs connected at any suitable location within the convenience outlet, and cooperative polarization means may be provided by the track component and by such plug to permit connection thereof in only one relative orientation. Each end connector, whether an end closure or a splice box, is connectable with a track component at an end thereof. In interconnecting two successive track components, a unitary splice box or coupler is used having opposite end portions in respective association with such components and in connecting a succession of track components at one end with power supply lines, a live end closure is used in association with a junction or end box within which the actual physical connection is made to the power supply lines.

An embodiment of the invention is illustrated in the accompanying drawings, in which.

Figure 1:
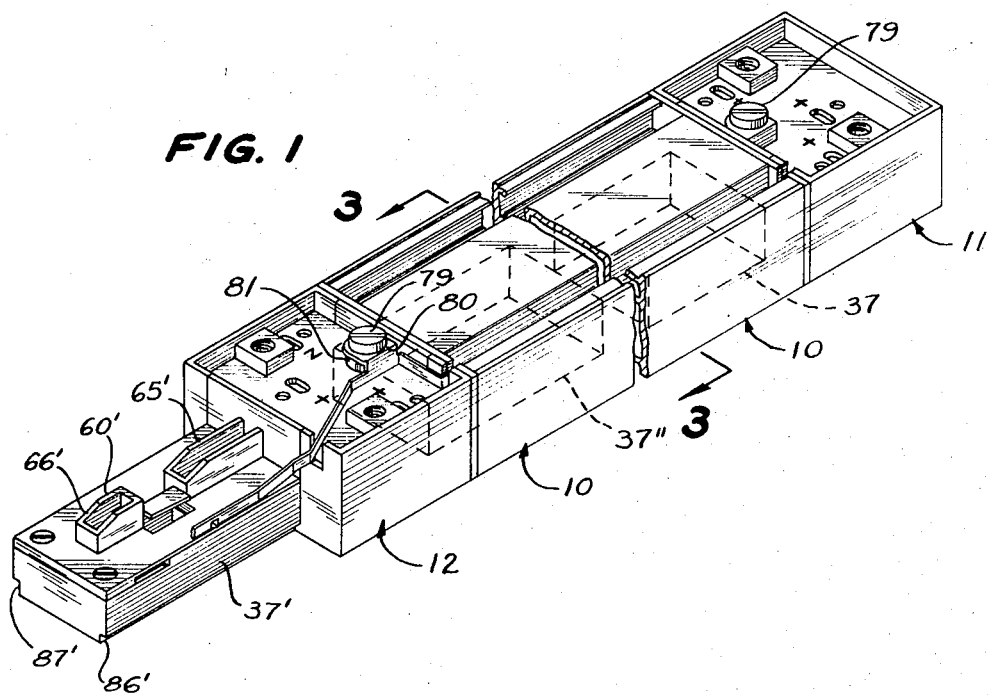
FIG. 1 is a broken perspective view illustrating both a live end closure and splice box connected with track components of a power distribution system embodying the present invention.

The power distribution system partially illustrated in FIG. 1 may include a plurality of interconnected track components 10, only one of which is shown, and they are each receptacle-equipped components adapted to have one or more plugs or adaptors (not shown) connected therewith at various locations therealong. Each such adaptor is usually associated with an electric fixture or appliance such as an incandescent lighting fixture (not shown). The track components are associated with end connectors 11 and 12, the first of which is a live end closure and the second a splice box or coupler. The track component 10 and end connectors 11 and 12 (and adaptors, not shown) are polarized so as to cause all of the elements of the power distribution system to have a predetermined orientation, thereby resulting in particular polarities being observed in interconnecting the same. The particular polarization means employed will be described in detail later, and at this point it may be observed that apart from such polarization means the track component 10 is generally symmetrical about a vertical center line therethrough; and in view of such general symmetry, the same numerals are employed to identify the oppositely positioned counterpart elements except that the suffixes $a$ and $b$ are added for purposes of differentiation therebetween.

Figure 2:
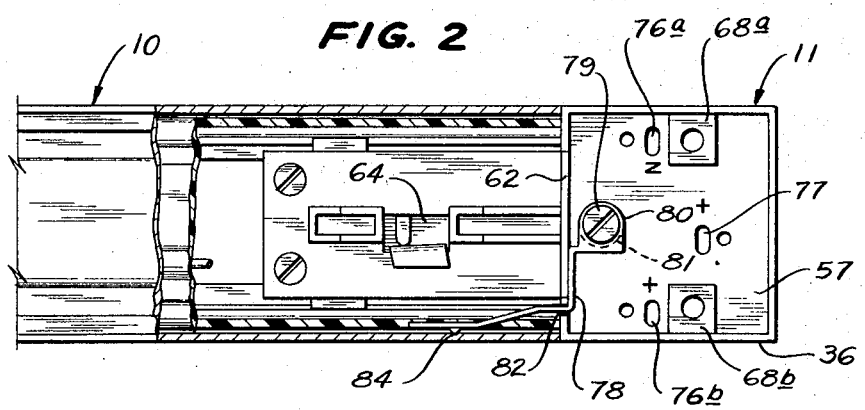
FIG. 2 is an enlarged, broken top plane view illustrating the live end closure shown in FIG. 1 in association with a track component, portions of which are broken away.
Figure 3:
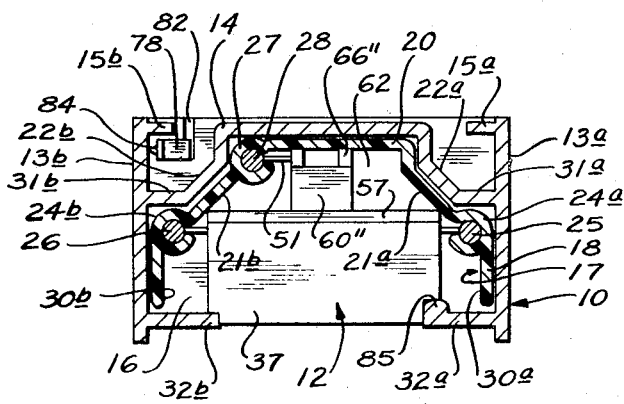
FIG. 3 is a further enlarged transverse sectional view, taken along the line 3—3 of FIG. 1, of a track component and splice box forming a part of the power distribution system.

Accordingly, and referring to FIGS. 2 and 3 in particular, the track component 10 is seen to include a pair of longitudinally extending and transversely spaced sidewalls 13a and 13b formed integrally with a longitudinally extending web 14 that is transversely disposed and projects between the sidewalls intermediate the top and bottom thereof. Adjacent their upper ends, the sidewalls 13 are turned inwardly to define flanges 15a and 15b that are used in securing the track component 10 to a ceiling or other support means, not shown. The track component 10 is intended to be assembled in succession with other like track components in a predetermined orientation so that circuit continuities are observed and maintained throughout an entire distribution system.

The track component 10 is provided with a chamber or receptacle 16 in underlying relation with the web 14, and such receptacle or chamber defines a longitudinally extending convenience outlet adapted to receive one or more adaptors therein. The chamber 16 adjacent its upper end in underlying relation with the web 14 is provided with a conductor assembly denoted in general with the numeral 17. The conductor assembly 17 includes an elongated insulator or insulated holder 18 having a web 20 of substantially the same generaly configuration as that of track web 14 so as to be able to closely underlie the same, as illustrated in FIG. 3. Therefore, the web 20 is also provided with downwardly inclined segments 21a and 21b respectively corresponding to the downwardly and outwardly inclined segments 22a and 22b of the track web 14.

The insulator 18 is provided adjacent the lower outer ends of the inclined sections 21a and 21b with longitudinally extending channel- or slot-forming sockets 24a and 24b respectively having conductors 25 and 26 mounted therein. Adjacent the upper end of the inclined section 21a at its mergence with the horizontal web section another longitudinally extending channel- or slot-forming socket 27 is provided and has a conductor 28 mounted therein. Each of the conductor-equipped sockets 24 and 27 is provided with a restricted mouth confining the associated conductor therein and adapted to pass therethrough one of the contacts of an adaptor or of the end connectors 11 and 12, as will be explained hereinafter. The conductors 25, 26 and 28 may be conventional copper wires (12 gauge, for example), and they are effectively constrained against longitudinal displacements with respect to the insulator 18 by the frictional grip of the respective sockets within which they are confined, thereby eliminating the use of collars crimped about the conductors as explained in the aforementioned U.S. Pat. No. 3,529,275.

The insulator 18 is sufficiently rigid to be substantially self substaining and maintain the conductors in the space apart relationship shown and to confine the same within the slots or channels therefor. The insulator 18 is also equipped with depending legs 30a and 30b respectively extending downwardly from the channel members 24a and 24b, and such legs are substantially parallel to the sidewalls 13a and 13b of the track 10.

Each leg 30 together with the associated slot portion or socket 24 has a vertical dimension slightly less than the distance between the horizontally oriented shoulders 31a and 31b respectively connecting the inclined sections 22a and 22b of the track web 14 with the sidewalls 13a and 13b and the respectively underlying inwardly turned flanges 32a and 32b that extend inwardly from the side walls 13a and 13b and are substantially parallel with the respectively facing shoulders 31a and 31b. The legs 30 generally maintain the conductor assembly 17 in the position or orientation shown but in the absence of an adaptor or end connector 11 or 12, the conductor assembly is free to move downwardly relative to the track 10 until the lower extremities of the legs 30 abut the inwardly turned flanges 32. Such relative dimensions of the legs 30 and spacing between the shoulders 31 and flanges 32 enables the conductor assembly 17 to fit rather loosely within the chamber 16 so that it is freely movable with respect thereto in longitudinal directions, thereby facilitating incorporation of the conductor assembly 17 within the track 10.

The conductor assembly 17 provides a plurality of circuits or pairs of conductors defining the same, and in the particular distribution system being considered there are two such circuits and, therefore, two pairs of conductors defining the same. In more particular terms, the conductor 25 is common to each of the two circuits and conductor pairs and may be considered the neutral conductor. The conductors 26 and 28 are selectively associated with the neutral conductor 25, and the adaptor used in the system is adapted to be selectively connected to one or the other of such circuits, as explained in the commonly assigned copending patent application of Larry L. Routh and James Contratto entitled "Adaptor For A Power Distribution System," Ser. No. 880,335, filed Nov. 26, 1969. As is well known, in the usual distribution system the potential defined between the neutral conductor 25 and either of the conductors 26 and 28 is of the order of 110 volts AC, and the potential across the conductors 26 and 28 (which potential is not ordinarily used) is of the order of 220 volts AC.

As suggested heretofore, for the purpose of enabling the receptacle-equipped track components to be readily accommodated by rooms and installations irrespective of the dimensional restrictions thereof, it is practicably necessary for such track components to be cut to length at the site of their installation, thereby requiring splice boxes and connector arrangements having no special structural characteristics associated with the track components which might be lost upon cutting the same to custom or special lengths. The end connectors 11 and 12 are so connectable with the receptacle-equipped track components 10 irrespective of their being cut to any particular lengths; and it may be noted that the connectors 11 and 12 are very similar with the connector 12 being essentially a double-ended connector 11. Accordingly the primed form of the same numerals used to identify the elements of the splice box 11 are used where appropriate to identify the respectively corresponding elements of the end closure 12.

The end closure 11 is not intended to have plugs, adaptors or other utilization devices connected therewith, and, accordingly, does not have a elongated receptacle for this purpose provided along the underside thereof. Generally, the closure 11 is intended to establish connection therethrough between a track component and connector block or junction box, and, therefore, includes a plurality of contacts to establish connection with the respective conductors of the track component 10. In positive terms, the closure 11 is provided with a pair of contacts 34a and 34b that respectively engage the conductors 25 and 26 of the track components 10, and with third or additional contact 35 which engages the conductor 28 of such track component.

The contacts 34 and 35 are mounted within a housing or casing 36 having a forwardly extending section 37 insertable into the chamber 16 of the track component 10 (as shown in FIGS. 1 and 2). The housing 36 is also provided with a rear end portion 38 enlarged both transversely by and vertically with respect to the end of the track section 37, and it is abuttable with the end of the track component 10 upon such insertion of the housing section 37 thereinto, also as shown in FIGS. 1 and 2. The housing is provided therein with a contact compartment 40 and with a connector compartment generally denoted 41.

Figure 4:
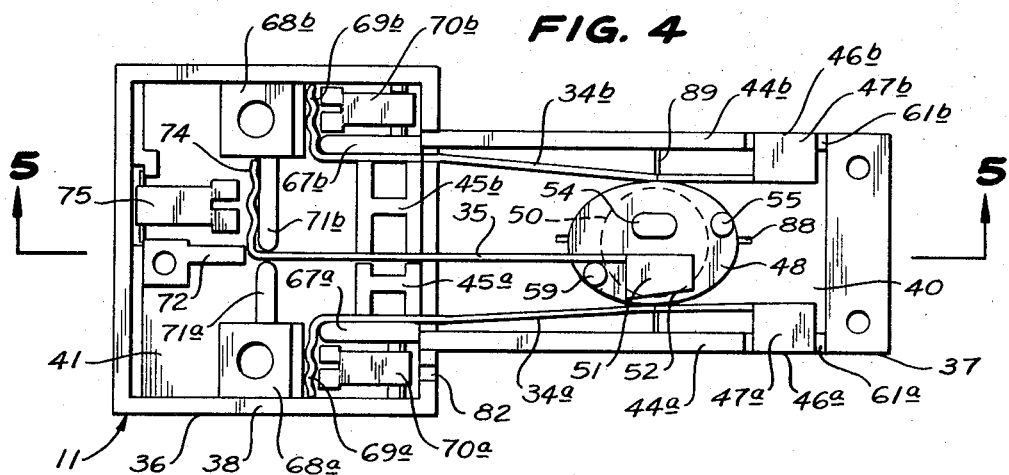
FIG. 4 is a top plan view of the live end closure shown in FIG. 2 but with the top cover thereof removed.

Each of the contacts 34 and 35 is elongated longitudinally with the contacts 34a and 34b being of the same length and disposed in transversely spaced, substantially parallel alignment, as is most evident in FIG. 4. Each of the contacts 34, extends forwardly from the connector compartment 41 and seats within a channel provided therefor that is defined between the housing sidewall 44a and an upwardly extending boss or wall structure 45a adjacent thereto in the case of the contact 34a and between the housing wall 44b and adjacent boss or wall structure 45b in the case of the contact 34b. The recesses respectively defined between the sidewalls 44 and bosses 45 confine the contacts 34 therein, and it may be observed that the contacts are bent laterally somewhat adjacent the bosses 45 and converge inwardly therefrom for a portion of their length to space the forward end portions of the contacts from the housing walls 44, as shown in FIG. 4, when the end closure is not in use. At the time of such non-use, the edges 46a and 46b of the outwardly turned terminal ends 47a and 47b of the contacts lie essentially within the transverse dimensions of the walls 44a and 44b. Thus, during insertion of the end closure 11 into the chamber 16 of the track component 10, the contacts 34 do not resist or otherwise inhibit such insertion.

Figure 7:
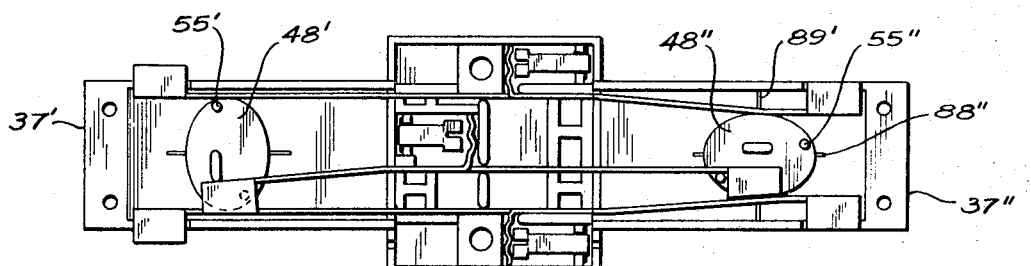
FIG. 7 is a top plan view of the splice box with the top cover thereof removed.

Following such insertion, however, the contacts 34 are displaced outwardly to cause such edges 46 thereof to mechanically and electrically engaged the conductors 25 and 26 of the track component 10, and such outward displacements of the forward end portions of the contacts 34 are effected by selector structure comprising an oblong or generally elliptical cam 48 supported by the housing section 37 along the bottom wall 49 thereof for angular displacements between the neutral position shown in FIG. 4 in which the greater axis of the ellipse is disposed in a longitudinal direction and an active position displaced therefrom by 90° in which such greater axis of the ellipse is transversely oriented, as shown in FIG. 2 (also compare the positions of the two elliptical cams in FIG. 7). The cam 48 may be angularly displaced in only one direction (i.e., counter-clockwise) from the position illustrated in FIG. 4 for the purpose of displacing the contacts 34 outwardly to engage the terminal ends 47 thereof with the conductors 25 and 26.

In this respect, the forward end portions of the contacts 34 extend along and in proximity with the bottom wall 49 of the housing section 37, and such contacts are engaged by the cam 49 along the bottom thereof, wherefore the contacts 34 are both displaced whenever the cam is turned. It may also be observed that the cam 48 has an end portion 50 extending downwardly through the bottom wall 49 of the housing section 30, and is provided with a slot for receipt of a screwdriver by means of which the cam can be rotated.

Figure 5:
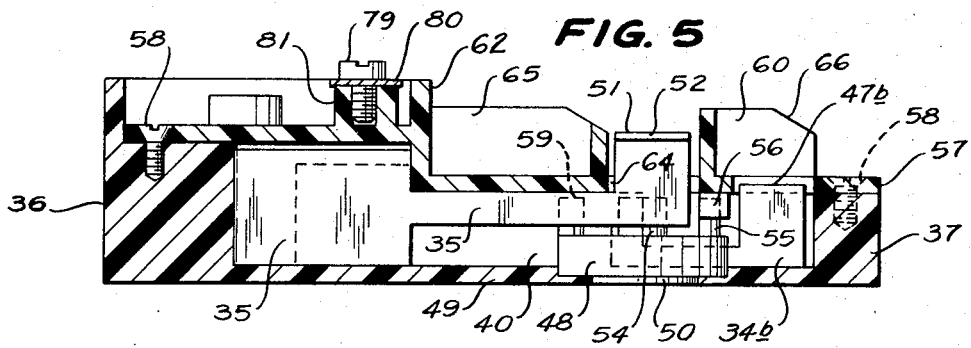
FIG. 5 is a longitudinal sectional view taken along the line 5—5 of FIG. 4.
Figure 6:
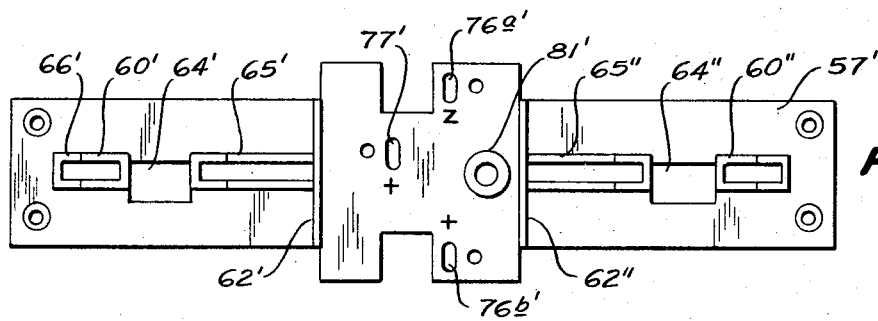
FIG. 6 is a top plane view of the splice box shown in FIG. 1.

The third contact 35 is centrally disposed and lies intermediate the paired contacts 34 and is somewhat shorter than such contacts in the longitudinal direction. The contact 35 projects forwardly from the connector compartment 41 through a slot defined between the bosses 45 and into the contact compartment 40. At its forward end, the contact 35 projects upwardly (as shown in FIG. 5) and is turned laterally outwardly thereat to provide a terminal end portion 51 having an outer 52 engageable with the conductor 28 of the track component 10 whenever the contact 28 is displaced outwardly from the inner neutral position shown to close FIG. 4 into the active outer position illustrated in FIG. 2.

Ordinarily, the contact 35 has the position shown in FIG. 4 in which it extends generally along the longitudinal axis of the end closure 11, and it is adapted to be engaged by an upwardly extending cam post 54 of the cam 48 upon displacement thereof through an angular distance approximating 90° from the neutral position shown in FIG. 4. Whenever the cam 48 is angularly displaced in a counter-clockwise direction, as viewed in FIG. 4, into the position shown in FIG. 2, the upwardly extending post 54 of the cam engages the contact 35 to displace it laterally, thereby causing the inclined edge 52 of the terminal end 51 thereof to be pushed into engagement with the conductor 28. At the same time, as explained heretofore, the contacts 34 will be displaced into engagement with the conductors 24, whereupon a three-conductor double electric circuit will be established — assuming that all three conductors of the track 10 are suitably connected to supply lines.

The cam 48 cannot be displaced angularly in the opposite direction (or clockwise as viewed in FIG. 4) because of the positive constraint established by abutment of a stop post 55 carried by the cam 48 as an upward projection therefrom with an abutment or limit member 56 (FIG. 5) extending downwardly from a cover plate 57 that is removably secured to the casing 38 by a plurality of screws 58. An additional post 59 extending upwardly from the cam 48 prevents over travel of the cam by limiting displacement thereof in the counter-clockwise direction through the possibility of abutment with the limit member 56, and it also positively returns the contact 35 to the neutral position thereof shown in FIG. 4. However, all of the contacts have sufficient resilience to be self-biased toward their retracted inner positions, and may be made of a material such as relatively hard brass which has such inherent resilience.

The contacts 34 are isolated from each other adjacent the outwardly turned terminal ends 47 thereof by a rib 60 (FIG. 5 in particular) that extends upwardly from the cover 57 along the center thereof. The casing end portion 37 is provided along each side thereof in general alignment with the rib 60 with recesses 61a and 61b through which the end portions 47a and 47b the respective contacts 34a and 34b extend. The cover 57 is adapted to seat upon the housing section 37 to close the compartment 40 thereof, and it also seats upon the housing section 36 to close the compartment 41. Evidently then, the cover 57 has a stepped portion including a generally vertical wall 62 adapted to abut the end of the track component 10 as, shown in FIGS. 1 and 2. The cover 57 is also provided with a transversely elongated opening 64 rearwardly of the rib 60 and through which the upwardly extended portion and terminal end 51 of the contact 35 extend.

An additional upwardly extending rib 65 is provided the cover 57 rearwardly of the opening 64 and in axial alignment with the rib 60, each of which is at the center of the cover. The ribs 60 and 65 both serve to urge the conductor assembly 17 upwardly relative to the metal track so as to force the two webs 20 and 14 into substantially contiguous relation, as shown in FIG. 3 respecting the splice box 12. The leading edge 66 of the rib 60 is inclined so as to facilitate insertion of the end closure 11 into the track component 10 and force the conductor assembly 17 upwardly to establish an accurate condition of alignment between the respective terminal ends 47 and 51 and the slots in the conductor carriers 24 and 27.

It will be observed in FIG. 4 that the contacts 34a and 34b are turned laterally within the connector compartment 41 at the respective ends of longitudinally extending wall segments 67a and 67b, and are disposed along connector posts 68a and 68b which have threaded openings therein to permit the end closure 11 to be fixedly secured to a junction box (not shown). The lateral turned end portions of the contacts 34 are formed so as to have a somewhat corrugated configuration as shown at 69a and 69b so as to seat generally cylindrical power supply lines or lead wires therein, and spring clips 70a and 70b which have resilient spring legs in substantial alignment with the respectively associated corrugations cooperate therewith in locking such lead wires into mechanical and electrical engagement with the contacts 34. A similar arrangement is provided for the contact 35 which is turned laterally adjacent a plurality of wall segments 71a, 71b, and 72, and is corrugated as shown at 74 so as to cooperate with a spring clip 75 in anchoring a lead wire in connection therewith.

Referring to FIG. 2, it will be observed that the cover 57 is provided with opening 76a and 76b respectively aligned with the laterally turned end portions 69a and 69b of the contacts 34 so as to permit the ends of lead wires to be inserted downwardly through cover 57 and into engagement with the contacts so as to be held thereagainst by the spring clips 70. Similarly, the cover 57 is also provided with an opening 77 in alignment with the laterally turned end 74 of the contact 35 so as to permit lead wires to be connected thereto. For convenience, the upper surface of the cover 57 is marked with the polarity so as to facilitate interconnection of a distribution system with the power supply lines. In this respect, the openings 76b and 77 are both marked for positive polarity, and the opening 76a is marked for connection of the neutral or line common to the two circuits respectively including the contacts 34a and 35.

It may also be seen in FIG. 2 that a ground contact 78 is fixedly secured to the cover 57 by means of a cap screw 79 extending through a laterally turned connector ear 80 forming a part of the contact 78, and which screw 79 is received within the threaded opening of an upwardly extending boss 81 provided by the cover 57. The ground contact or wire 78 extends forwardly through a slot 82 provided therefor in a vertical wall of the casing or housing section 36 so that the outer free end of the ground contact extends generally along the forwardly projecting end portion 37 of the end closure 11. The ground contact 78 is a resilient component that is biased outwardly because of its inherent resilience, and it may be provided with a barb 84 enabling it to scrap or gouge the inner surface of the metal track component 10 so as to establish a good electric conduction therewith. In this respect, the metal track forming a part of the track component 10 is adapted to be used as the ground conductor for the entire distribution system so that interconnection of successive track components via the ground contacts of the splice boxes 12 is necessary. The system itself can be grounded to the power distribution system by appropriate connection of the ground wire thereof with the track components, as by means of the screw 79 at an end closure 11. It might be observed, however, that in certain instances use of the metal track as the ground for the system may not be desired, and in this event a single electric circuit could be provided such as across the conductors 25 and 26 with the conductor 28 serving as a ground for the two-wire distribution system.

Inspection of FIG. 3 makes it evident that the conductors 25, 26 and 28 extending along each track component 10 have a predetermined orientation with respect to each other, and since the conductors are not symmetrically disposed (the conductor 28 being offset from the center of the track component in one direction), right-hand and left-hand end closures 11 must be provided in order that any particular track component can be selectively connected at either end thereof to a power distribution system. The right-hand and left-hand end closures 11 may be substantially the same except that the casing or housing 36 and particularly the end portion 37 thereof must be changed slightly to permit insertion thereof into a track component 10 from the opposite direction, and that the contact 35 must have the end portion 51 thereof turned in the opposite lateral direction so that the cam 48 (which must be reversely oriented) can displace the same laterally in the opposite direction so as to establish connection of the terminal end 51 with the conductor 28. As respects the changes required in the casing or housing 36, it will be observed by referring to FIG. 3 that the track component 10 is polarized so that the end connectors 11 and 12 can be inserted thereinto in only one predetermined orientation with respect thereto. More particularly, the inwardly extending flange 32a of the tract component 10 is provided along the inner edge thereof with an upwardly extending rib or lip 85 but the corresponding flange 32b is without such rib, thereby making the track component asymmetrical about a center plane therethrough. Evidently then, each of the end connectors 11 and 12 must be configurated along the forwardly extending end 37 thereof so as to accommodate the polarizing rib 85, and such configuration is most evident in FIG. 1 which shows that the end connector 12 is provided along each of the bottom edges thereof with channels or recesses 86 and 87 the latter of which is sufficiently large in a vertical direction so as to accomodate the polarizing rib 85. Thus, depending upon the direction fromwhich an end closure 11 is to be inserted into the track component 10, one or the other of the longitudinal edges of the forward projection 37 will have the larger channel or recess 87 so as to receive the polarizing rib 85.

As respects the opposite orientation of the terminal end 51 of the center contact 35, the opening 64 in the cover 57 may be sufficiently wide so as to accommodate either orientation of the contact 35. However, if the cover 57 is marked so as to indicate the positive and neutral apertures 76 and 77, the markings associated with the apertures 76 would have to be reversed from that shown in FIG. 2 in the case of an end closure 11 adapted to enter the opposite end of the track component 10. Referring to FIG. 4, it will be appreciated that the cam 48 would have to be turned end for end (i.e., rotated 180°) in order for the cam post 54 thereof to displace a center contact 35 in the opposite direction. Such opposite orientation of the cam 48 would place the posts 59 in the position of the posts 55 shown in FIG. 4 so that it would then serve as the stop engageable with the abutment 56 so as to limit rotation of the cam in a clockwise direction since it is desired that the cam 48 still rotate in the same angular direction to enforce outward displacement onto the contact 37.

End connectors in the form of splice boxes or couplers 12 are essentially the same as the end closures 11 except that they have an additional outwardly projecting end portion so as to cooperate with two successive track components 10 and join or interconnect the same. This identity of the two different types of end connectors is most apparent by comparing the external appearances of the two connectors, as shown in FIGS. 1 and 2, and by comparing the internal characteristics thereof as shown best in FIGS. 4 and 7. The essential difference, is that the contacts are integers respectively extending from one end portion of the splice box to the other end portion thereof with laterally turned segments within the central connector compartment to enable supply lines to be connected thereto or to permit other track components to be electrically connected therewith should either condition be desired. As indicated hereinbefore, because of the similarity both functionally and structurally between the two types of end connectors 11 and 12, the same numerals are applied to the splice box 12 to designate the parts thereof respectively corresponding to those in the end closure 11 except that the primed form of the numerals are used, and for purposes of differentiation between the right-hand and left-hand ends of the splice box 12 both single and double primed numerals are used.

It is evident from all of the foregoing that the end connectors 11 and 12 cooperate with tract components 10 simply by inserting the end portions 37 of the appropriate connectors into the track components and then rotating the respectively associated cams 48 through an angular associated approximating 90° so as to displace all of the contacts 34 and 35 outwardly and into electrical engagement with the respectively associated conductors 25, 26 and 27. Since the track components 10 and the end connectors 11 and 12 are polarized, there is no way to improperly interconnect the same since the larger channel or recess 87 must be aligned with the polarizing rib 45 before an end portion 37 of a connector can be inserted into the channel component. Thus, proper polarity is maintained throughout the entire distribution system. It may be noted that the adaptors (not shown but disclosed in the aforementioned patent application, Ser. No. 880,335) used to connect lighting fixtures and other appliances to the distribution system are also polarized so that each such appliance when connected to the system is necessarily connected so that proper polarity is preserved.

Figure 8:
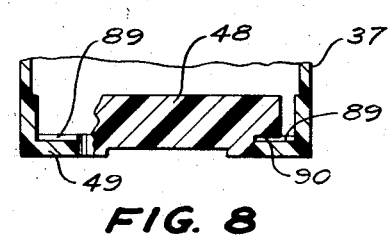
FIG. 8 is a broken transverse sectional view through a selector structure.

As each end connector 11 and 12 is inserted into a track component 10, the conductor assembly 17 which is loosely supported within the track is cammed upwardly by the ribs 60 and 65 of the connector so as to accurately align the openings or mouths in the conductor holders or sockets 24 and 27 with the terminals 47 and 51 of the contacts so that no difficulty is experienced in effecting the electric connection between the conductors 25, 26 and 27 and the respectively associated contacts 34 and 35 when the cam 48 is rotated. Respecting rotation of the cam 48 and establishing the desired angular position thereof, means are provided for indicating when the cam attains such position both by sound and by touch or feel. The means employed is best seen in FIGS. 4 and 7 and 8, and it comprises two sets of narrow slots or depressions 88 and 89 forming along the inner surface of the bottom wall 49 of the connector and oriented at right angles with respect to each other, and a rib or projection 90 formed along the bottom of the cam 48 and alignable selectively with either of the ribs 88 or 89 depending upon whether the cam is in the disconnect position thereof shown by the cams 48 and 48'' in FIGS. 4 and 7 or in the active position thereof shown by the cam 48' in FIG. 7 and 48 in FIGS. 2 and 8. The recesses 88 and 89 and cooperative ribs 90 are shallow and do not substantially inhibit angular displacement of the cams 48. However, the cover 57 essentially rides on the posts 54, 55 and 59 of the cam 48 to urge the same downwardly and as a consequence thereof, the ribs 90 tend to snap into the recesses 88 and 89 and can be both heard and felt.

The openings or aperture 76 and 77 in the covers 57 of the end connectors are sufficiently large to receive two lead wires should this be desired, and the laterally turned portions of the contacts have two recesses or corrugations respectively cooperative with the spring means or the spring clips 70 and 75 so as to accept and connect any such two lead wires with the contacts. Further, the end connectors are useful with track components 10 at the ends thereof without the requirement for special structural provision thereat so that track components can be cut to any necessary or desirable length to accommodate the requirements of a particular installation. Accordingly, it is only necessary to cut a track component to the length desired, insert the end portion 37 of the connector into the track component, and then rotate the cam 48 through an angular distance of 90° to establish the electric connection.

The housing 36 and cover 57 may be formed of an insulating material and may be fabricated of various materials having dielectric characteristics such as one of the plastic materials, a polycarbonate for example. The track component, except for the conductor assembly thereof, may be metal, extruded aluminum for example.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. An end connector or the like for use in a power distribution system having a track component provided with a conductor assembly that includes a plurality of conductors insulated one from the others, comprising a casing having a section thereof insertable into such chamber, a pair of contacts mounted within said casing and movable with respect thereto between inner retracted positions and outer extended positions for respective engagement with such chamber, selector structure adjustably carried by said casing for movement with respect thereto and being engageable with said contacts to displace the same selectively from their retracted positions into their extended positions, and polarization means carried by said casing and cooperative with such track component to positively determine the permissible interconnections of said end connector with such track component so as to preserve predetermined polarities throughout a power distribution system, said casing section being equipped along the upper surface thereof with an upwardly extending rib having an inclined leading edge engageable with a conductor assembly provided by such track component so as to enforce a predetermined positional relationship upon such conductor assembly relative to said end connector and thereby facilitate connection of said contacts with the respective conductors of such conductor assembly.

2. An end connector or the like for use in a power distribution system having a track component provided with a longitudinally extending chamber therealong equipped with a conductor assembly that includes a plurality of conductors insulated one from the others, comprising a casing having a section thereof insertable into such chamber, a pair of contacts mounted within said casing and movable with respect thereto between inner retracted positions and outer extended positions for respective engagement with such chamber, selector structure adjustably carried by said casing for movement with respect thereto and being engageable with said contacts to displace the same selectively from their retracted positions into their extended positions, and polarization means carried by said casing and cooperative with such track component to positively determine the permissible interconnections of said end connector with such track component so as to preserve predetermined polarities throughout a power distribution system, said casing section being equipped along the upper surface thereof with an upwardly extending rib having an inclined leading edge engageable with a conductor assembly provided by such track component so as to enforce a predetermined positional relationship upon such conductor assembly relative to said end connector and thereby facilitate connection of said contacts with the respective conductors of such conductor assembly.

3. An end connector or the like for use in a power distribution system having a track component provided with a longitudinally extending chamber therealong equipped with a conductor assembly that includes a plurality of conductors insulated one from the others, comprising a casing having a section thereof insertable into such chamber, a pair of contacts mounted within said casing and movable with respect thereto between inner retracted positions and outer extended positions for respective engagement with such conductors following insertion of said casing section into such chamber, selector structure adjustably carried by said casing for movement with respect thereto and being engageable with said contacts to displace the same selectively from their retracted positions into their extended positions, and polarization means carried by said casing and cooperative with such track component to positively determine the permissible interconnections of said end connector with such track component so as to preserve predetermined polarities throughout a power distribution system, said end connector defining a splice box adapted to couple a pair of successive track components and said casing having a pair of the aforesaid sections oriented in opposite directions and being respectively insertable into the chambers provided by successive track components, each of said casing sections being equipped along the upper surface thereof with an upwardly extending rib having an inclined leading edge engageable with a conductor assembly provided by such track component so as to enforce a predetermined positional relationship upon such conductor assembly relative to said splice box and thereby facilitate connection of said contacts with the respective conductors of such conductor assembly.

4. The end connector of claim 3 in which each of said contacts extends from end to end of said splice box and is provided with an end portion located within each casing section and independently movable as aforesaid between inner retracted and outer extended positions, and in which a pair of selector structures are provided in respective association with said casing section and being engageable with the end portions therein of said contacts to displace the same selectively from their retracted positions into their extended positions.

5. The end connector of claim 4 and further comprising an additional contact mounted within said casing and extending substantially from end to end thereof and having end portions located within said casing sections and being movable with respect thereto between an inner retracted position and an outer extended position, each of said selector structures being engageable with the associated end portion of said additional contact so as to displace such end portion into the extended position thereof concurrently with displacement of the corresponding end portions of the aforesaid pair of contacts.

6. The end connector of claim 4 and further comprising a ground contact secured to said casing and having free end portions respectively extending generally along said casing sections, said ground contact being resiliently engageable with such track components upon insertion of said casing sections thereinto so as to establish an electrical connection therewith.

7. The end connector of claim 4 in which each of said selector structures is supported by the associated casing section for angular displacement with respect thereto between positions respectively corresponding to the extended and retracted positions of said contacts, and in which indicator means are provided by each of said casing sections and each selector structure to provide indicia indicative of selective attainment by said selector structure of the alternate positions thereof.

8. An end connector or the like for use in a power distribution system having a track component provided with a longitudinally extending chamber therealong equipped with a conductor assembly that includes a plurality of conductors insulated one from the others, comprising a casing having a section thereof insertable into such chamber, a pair of contacts mounted within said casing and movable with respect thereto between inner retracted positions and outer extended positions for respective engagement with such conductors following insertion of said casing section into such chamber, selector structure adjustably carried by said casing for movement with respect thereto and being engageable with said contacts to displace the same selectively from their retracted positions into their extended positions, polarization means carried by said casing and cooperative with such track component to positively determine the permissible interconnections of said end connector with such track component so as to preserve predetermined polarities throughout a power distribution system, said casing section being equipped along the upper surface thereof with an upwardly extending rib having an inclined leading edge engageable with a conductor assembly provided by such track component so as to enforce a predetermined positional relationship upon such conductor assembly relative to said end connector and thereby facilitate connection of said contacts with the respective conductors of such conductor assembly, and a ground contact secured to said casing and extending generally along said casing section, said ground contact being resiliently engageable with such track component upon insertion of said casing section thereinto so as to establish an electrical connection therewith.

9. The end connector of claim 8 and further comprising an additional contact mounted within said casing and being movable with respect thereto between an inner retracted position and an outer extended position for engagement with one such conductor following insertion of said casing section into the chamber of such track component, said selector structure being engageable with said additional contact so as to displace the same into the extended position thereof concurrently with the aforesaid pair of contacts, in which said casing and selector structure are provided with cooperative stop members enabling said selector structure to move in only one direction in displacing all of said contacts from their retracted positions not their extended positions, and in which said casing is provided with an end portion larger in at least one transverse dimension than said casing section and being abuttable with an end of such track component to limit the extent of insertion of said casing section into the chamber thereof.

10. The end connector of claim 9 in which said selector structure is supported by said casing for angular displacement with respect thereto between positions respectively corresponding to the extended and retracted positions of said contacts, and in which indicator means are provided by said casing and selector structure to provide indicia indicative of selective attainment by said selector structure of the alternate positions thereof, said indicator means comprising rib and recess components respectively provided by said casing and selector structure.

11. The end connector of claim 10 in which said polarization means includes longitudinally extending channels adjacent edge portions of said casing section, one of said channels being larger than the other so as to receive therein a polarizing rib provided by such track component.

12. An end connector or the like used in a power distribution system having a relatively rigid track component provided with a longitudinally extending chamber therealong equipped with a conductor assembly that includes a plurality of conductors insulated one from the other and is movable slightly within said chamber between upper and lower positions, comprising a casing having a section thereof inserted into such chamber, a pair of contacts mounted within said casing for respective engagement with such conductors upon insertion of said casing section into such chamber, and said casing section being equipped along the upper surface thereof with an upwardly extending rib having an inclined leading edge which engages said conductor assembly provided by such track component so as to enforce a predetermined positional relationship upon such conductor assembly relative to said end connector and thereby facilitate connection of said contacts with the respective conductors of such conductor assembly.

13. The end connector of claim 12 defining a splice box adapted to couple a pair of successive track components, said casing having a pair of the aforesaid sections oriented in opposite directions and being respectively inserted into the chamber provided by successive track components, and each of said casing sections being equipped along the upper surface thereof with an upwardly extending rib having an inclined leading edge which engages said conductor assembly provided by such track component so as to enforce a predetermined positional relationship upon such conductor assembly relative to said splice box and thereby facilitate connection of said contacts with the respective conductors of such conductor assembly.

14. An end connector or the like for use in a power distribution system having a track component provided with a longitudinally extending chamber therealong equipped with a conductor assembly that includes a plurality of conductors insulated one from the others, comprising a casing having a section thereof insertable into such chamber, a pair of contacts mounted within said casing and movable with respect thereto between inner retracted positions and outer extended positions for respective engagement with such conductors following insertion of said casing section into such chamber, selector structure adjustably carried by said casing for movement with respect thereto between positions respectively corresponding to the extended and retracted positions of said contacts and being engageable therewith to displace the same selectively from their retracted positions into their extended positions, and indicator means provided by said casing and selector structure to provide indicia indicative of selective attainment by said selector structure of the alternate positions thereof, said indicator means comprising rib and recess components respectively provided by said casing and selector structure; said end connector defining a splice box adapted to couple a pair of successive track components, said casing having a pair of the aforesaid sections oriented in opposite directions and being respectively insertable into the chambers provided by successive track components, each of said contacts extending from end-to-end of said splice box and being provided with an end portion located within each casing section and independently movable as aforesaid between inner retracted and outer extended positions, a pair of selector structures as aforesaid being provided in respective association with said casing section and being engageable with the end portions therein of said contacts to displace the same selectively from their retracted positions into their extended positions, and a pair of indicator means as aforesaid being provided in respective association with said selector structures.

15. The end connector of claim 14 and further comprising an additional contact mounted within said casing and extending substantially from end-to-end thereof and having end portions located within said casing sections and being movable with respect thereto between an inner retracted position and an outer extended position, each of said selector structures being engageable with the associated end portion of said additional contact so as to displace such end portion into the extended position thereof concurrently with displacement of the corresponding end portions of the aforesaid pair of contacts.

16. An end connector or the like for use in a power distribution system having a relatively rigid track component provided with a longitudinally extending chamber therealong equipped with a conductor assembly that includes a plurality of conductors insulated one from the other and is movable slightly within said chamber between upper and lower positions, comprising a casing having a section thereof insertable into such chamber, a pair of contacts mounted within said casing for respective engagement with such conductors upon insertion of said casing section into such chamber, said contacts being movable between inner retracted and outer extended positions, and further comprising selector structure adjustably carried by said casing for movement with respect thereto between positions respectively corresponding to the extended and retracted positions of said contacts and being engageable therewith to displace the same selectively from their retracted positions into their extended positions, and said casing section being equipped along the upper surface thereof with an upwardly extending rib having an inclined leading edge engageable with a conductor assembly provided by such track component so as to enforce a predetermined positional relationship upon such conductor assembly relative to said end connector and thereby facilitate connection of said contacts with the respective conductors of such conductor assembly.

17. An end connector or the like for use in a power distribution system having a relatively rigid track component provided with a longitudinally extending chamber therealong equipped with a conductor assembly that includes a plurality of conductors insulated one from the other and is movable slightly within said chamber between upper and lower positions, comprising a casing having a section thereof insertable into such chamber, a pair of contacts mounted within said casing for respective engagement with such conductors upon insertion of said casing section into such chamber, and said casing section being equipped along the upper surface thereof with an upwardly extending rib having an inclined leading edge engageable with a conductor assembly provided by such track component so as to enforce a predetermined positional relationship upon such conductor assembly relative to said end connector and thereby facilitate connection of said contacts with the respective conductors of such conductor assembly, and further comprising an additional contact mounted within said casing for engagement with one such conductor upon insertion of said casing section into such chamber.

* * * * *